US010204637B2

(12) United States Patent
Forte

(10) Patent No.: US 10,204,637 B2
(45) Date of Patent: Feb. 12, 2019

(54) NOISE REDUCTION METHODOLOGY FOR WEARABLE DEVICES EMPLOYING MULTITUDE OF SENSORS

(71) Applicant: Stephen P Forte, Beverly Hills, CA (US)

(72) Inventor: Stephen P Forte, Beverly Hills, CA (US)

( * ) Notice: Subject to any disclaimer, the term of this patent is extended or adjusted under 35 U.S.C. 154(b) by 143 days.

(21) Appl. No.: 15/600,712

(22) Filed: May 20, 2017

(65) Prior Publication Data

US 2017/0337933 A1 Nov. 23, 2017

Related U.S. Application Data

(60) Provisional application No. 62/339,860, filed on May 21, 2016.

(51) Int. Cl.

*G10L 21/0208* (2013.01)
*H04M 1/05* (2006.01)
*H04R 3/04* (2006.01)

(52) U.S. Cl.

CPC ............ *G10L 21/0208* (2013.01); *H04R 3/04* (2013.01); *H04R 2430/03* (2013.01)

(58) Field of Classification Search

CPC .... G10L 21/0208; H04R 3/04; H04R 2430/03
USPC ........................................................ 704/226
See application file for complete search history.

(56) References Cited

U.S. PATENT DOCUMENTS

2002/0176589 A1* 11/2002 Buck .................. G10L 21/0208 381/94.7
2010/0005954 A1* 1/2010 Higashidate ........... G10H 3/143 84/725
2010/0323657 A1* 12/2010 Barnard ................ H04M 1/663 455/404.1
2013/0090939 A1* 4/2013 Robinson ............... G06Q 50/22 705/2
2013/0090942 A1* 4/2013 Robinson ............... G06Q 10/10 705/2
2014/0206954 A1* 7/2014 Yuen .................. A61B 5/02405 600/301
2015/0066494 A1* 3/2015 Salvador ............. G10L 21/0202 704/224
2015/0204844 A1* 7/2015 Nothacker ......... G01N 33/4972 73/23.3

(Continued)

*Primary Examiner* — Edwin S Leland, III

(57) ABSTRACT

Disclosed is a wearable device for producing noise free communication. The wearable device includes a housing configured to wear by a user, an air conduction microphone configured in the housing to receive voice sound of the user, an accelerometer sensor configured in the housing to receive voice signature, a battery configured in the housing to power the air conduction microphone and the accelerometer sensor, a printed circuit board configured in the housing to receive power from the battery, a memory unit connected to the printed circuitry board to store plurality of instructions, and a digital signal processor connected to the printed circuit board to process the stored plurality of instructions. The instructions are programmed to achieve a noise free communication. The voice from both air conduction microphone and the accelerometer sensor are analyzed to filter out noise and resulting in generation of noise free communication.

8 Claims, 3 Drawing Sheets

(56) References Cited

U.S. PATENT DOCUMENTS

| | | | | |
|---|---|---|---|---|
| 2016/0047890 | A1* | 2/2016 | Ryan | G01S 5/16<br>398/118 |
| 2016/0072891 | A1* | 3/2016 | Joshi | G06Q 30/0269<br>370/254 |
| 2016/0231830 | A1* | 8/2016 | Nemala | G06F 3/038 |
| 2017/0337933 | A1* | 11/2017 | Forte | H04R 3/04 |

* cited by examiner

NOISE REDUCTION METHODOLOGY FOR WEARABLE DEVICES EMPLOYING MULTITUDE OF SENSORS

CROSS REFERENCE TO RELATED APPLICATION

This application claims priority of U.S. provisional patent application No. 62/339,860 filed on May 21, 2016; which is incorporated by reference herein in its entirety.

BACKGROUND OF THE INVENTION

1. Field of the Invention

The present invention generally relates to a wearable device for producing noise free communication, and more particularly relates to a wearable device having at least two microphones to filter out noises for producing noise free audio communication.

2. Description of Related Art

Voice communication devices such as cell phones, wireless phones and devices other digital communication devices have become ubiquitous; they are required to be used in almost every environment. These systems and devices and their associated communication methods are referred by a variety of names including but not limited to cellular telephones, cell phones, mobile phones, wireless telephones and devices such as Personal Data Assistants (PDAs) that include a wireless or cellular telephone communication capability.

With an air conduction microphone, the speaker in the noisy environment typically needs to speak louder, often repeat, must orient himself away from the impeding background noise, keep the microphone very close to his mouth, and cover the microphone to reduce noise entering directly into the microphone. Even with this tiresome effort, there is no guarantee that the other party has heard every message.

On the other hand, with bone conduction microphones, two-way communication is done by wearing the bone conduction microphone externally making contact with the body at places like the scalp, ear canal, mastoid bone (behind ear), throat, cheek bone, and temples. Unlike air conduction microphone, bone conduction microphones pickup less noise as it collects voice signals from body vibration and doesn't pickup signals from air. However, bone conduction microphones have following drawbacks:

Firstly (1), they tend to lose information due to the presence of skin and the inconsistent vibration levels of speech that can typically result in signal attenuation and loss of bandwidth, and (2) typically they require some form of pressure to create a good contact between the skin and the sensor that can be inconsistent producing varied results.

Secondly, bone conduction microphones require close contact with speaker. As third point, signal level may vary depending upon the contact levels, humidity and other environmental changes. As a final significant point, it may pickup non-auditory body vibrations. In short, the sound quality received by the bone conducted microphone is not that great when compared to the traditional microphone.

Various products and methods are known that improves the quality of audio signals received from microphones. However, these prior inventions failed to provide for design robustness and the wide noise suppression bandwidth required for clear communication in high ambient noise fields.

Therefore, there is a need of a system for improving quality of an audio signal in a voice communication using two separate types of microphones. Further, the system using controller and algorithm features to improve the performance over the prior art noise-cancelling microphones.

SUMMARY OF THE INVENTION

In accordance with teachings of the present invention, a wearable device for producing noise free communication is provided.

An object of the present invention is to provide a wearable device including housing, an air conduction microphone, an accelerometer sensor, a battery, a printed circuit board, a memory unit and a digital signal processor. The housing is configured to wear by a user. The air conduction microphone is configured in the housing to receive voice sound of the user.

The accelerometer sensor is configured in the housing to receive voice signature. The battery is configured in the housing to power the air conduction microphone and the accelerometer sensor. The printed circuit board is configured in the housing to receive power from the battery.

The memory unit is connected to the printed circuit board to store plurality of instructions. The digital signal processor is connected to the printed circuit board to process the stored plurality of instructions. The instructions include the steps of storing frequency range of human voice range.

Further, the instructions include the steps of receiving voice sound and voice signature from the air conduction microphone and the accelerometer sensor respectively; and filtering sound from both the air conduction microphone and the accelerometer sensor to attenuate input from frequency ranges outside the user's voice range.

Followed by the steps of performing equalizing function to balance import frequencies; detecting the type of noise occurring in the background of the air conduction microphone; cleaning the air conduction microphone voice sound; and creating a template of the voice signature pattern from the accelerometer sensor.

Followed by the steps of comparing the voice signal pattern from the air conduction microphone with the template of the voice signature pattern; and cancelling out the inputs from the air conduction microphone for a period where the accelerometer sensor shows no activity.

Followed by the step of raising the same amount of increase in the same frequency range from the air conduction microphone based upon corresponding band signal level in voice signature (VS) from the accelerometer sensor. Followed by the conclusion step of blending the filtered signal from the air conduction microphone and the accelerometer sensor into a single voice signal for communication.

Another object of the present invention is to provide the wearable device with a first equalizer to attenuate sound from the air conduction microphone that are not associated with the frequencies of human voice and a first filter bank to split the sound received from the first equalizer into various frequencies bands, and apply gains reported based on corresponding bands of the voice signature (VS).

Another object of the present invention is to provide the wearable device with a second equalizer to block sound from the accelerometer sensor that are not associated with the frequencies of human voice, and a second filter bank to split the sound received from the second equalizer into various frequencies group. Further, the second filter bank and apply gains used for scaling the respective bands of the first equalizer.

Another object of the present invention is to provide the wearable device wherein the instructions further comprising the step of dynamically adjusting the gain of the frequency groups received from the first filter bank based on the gain levels measured of the VS Gains from the second filter bank; and processing the voice signals and reassembling the various frequencies into a single output sound.

These and other features and advantages will become apparent from the following detailed description of illustrative embodiments thereof, which is to be read in connection with the accompanying drawings.

DETAILED DESCRIPTION OF DRAWINGS

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout. Unless otherwise noted in this specification or in the claims, all of the terms used in the specification and the claims will have the meanings normally ascribed to these terms by workers in the art.

Figure 1:
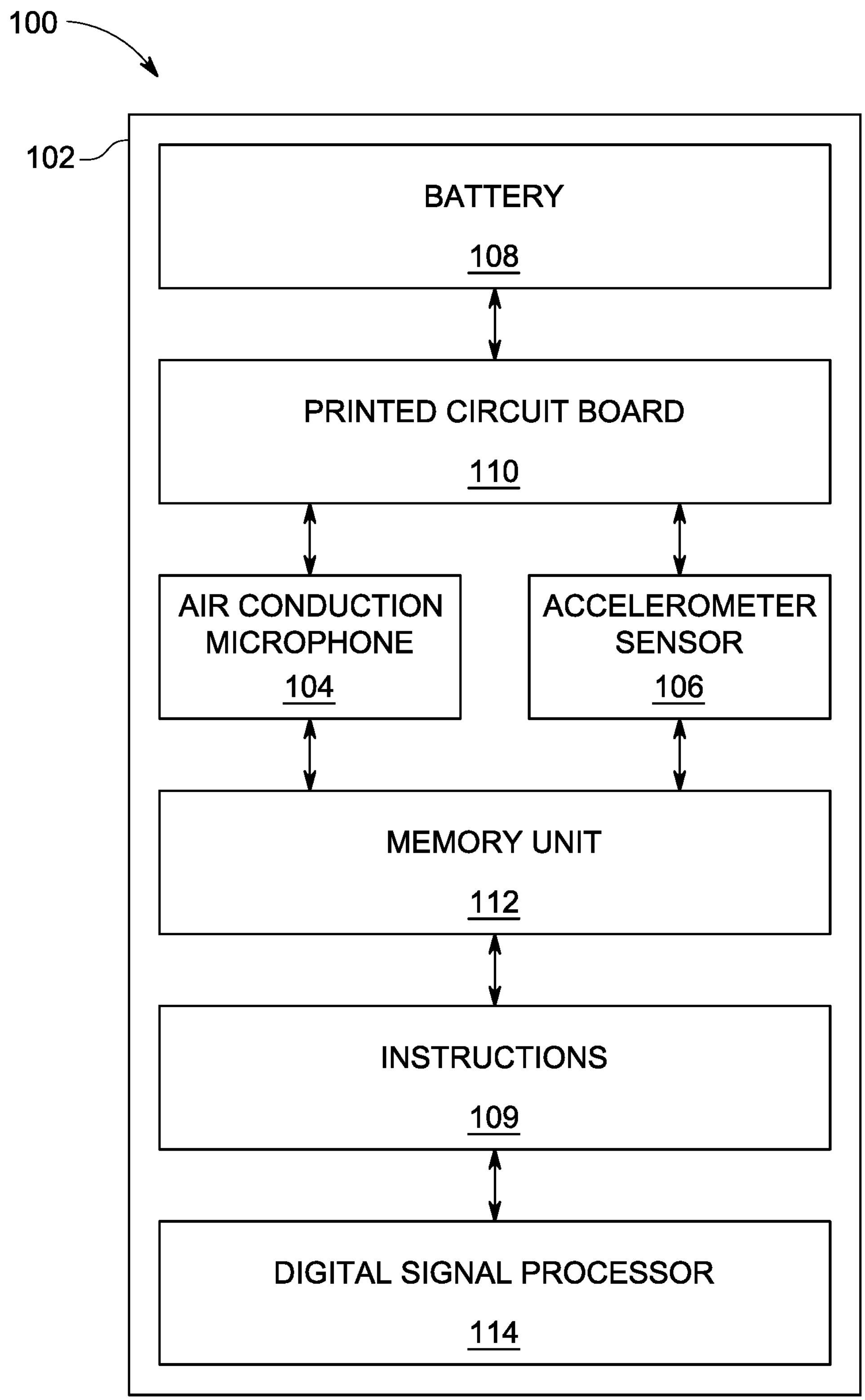
FIG. 1 illustrates a block diagram indicating a wearable device in accordance with a preferred embodiment of the present invention.

FIG. 1 illustrates a block diagram indicating a wearable device 100 in accordance with a preferred embodiment of the present invention. The wearable device produces noise free communication. The wearable device 100 includes a housing 102, an air conduction microphone 104, an accelerometer sensor 106, a battery 108, a printed circuit board 110, a memory unit 112, and a digital signal processor 114.

The housing 102 is configured to wear by a user. Examples of housing 102 include but not limited to neck worn collars, headphones, earphones, wired or wireless headphones etc. The air conduction microphone 104 is configured in the housing 102 to receive voice sound of the user. The voice is received in most effective way without compromising user convenience.

Examples of the air conduction microphone 104 include but not limited to electret, condenser, piezo, MEMS etc. The accelerometer sensor 106 is configured in the housing 102 to receive voice signature (VS). The Voice Signature (VS) is the low frequency noise free information about voice with minimum possible interference and noise. The VS is used to refine the signal from the air conduction microphone 104.

In another preferred embodiment of the present invention, there are more than one accelerometer sensors 106, thus the variations in the voice signature is considered by array processing or similar DSP algorithms. The battery 108 is configured in the housing 102 to power the air conduction microphone 104 and the accelerometer sensor 106.

In another preferred embodiment of the present invention, the air conduction microphone 104 and the accelerometer sensor 106 produces analog samples. The analog samples are converted into digital samples with the help of appropriate digital to analog convertors.

The printed circuitry board 110 is configured in the housing 102 to receive power from the battery 108. The memory unit 112 is connected to the printed circuitry board 110 to store the plurality of instructions 109. The digital signal processor 114 is connected to the printed circuitry board 110 to process the stored plurality of instructions 109.

Figure 2:
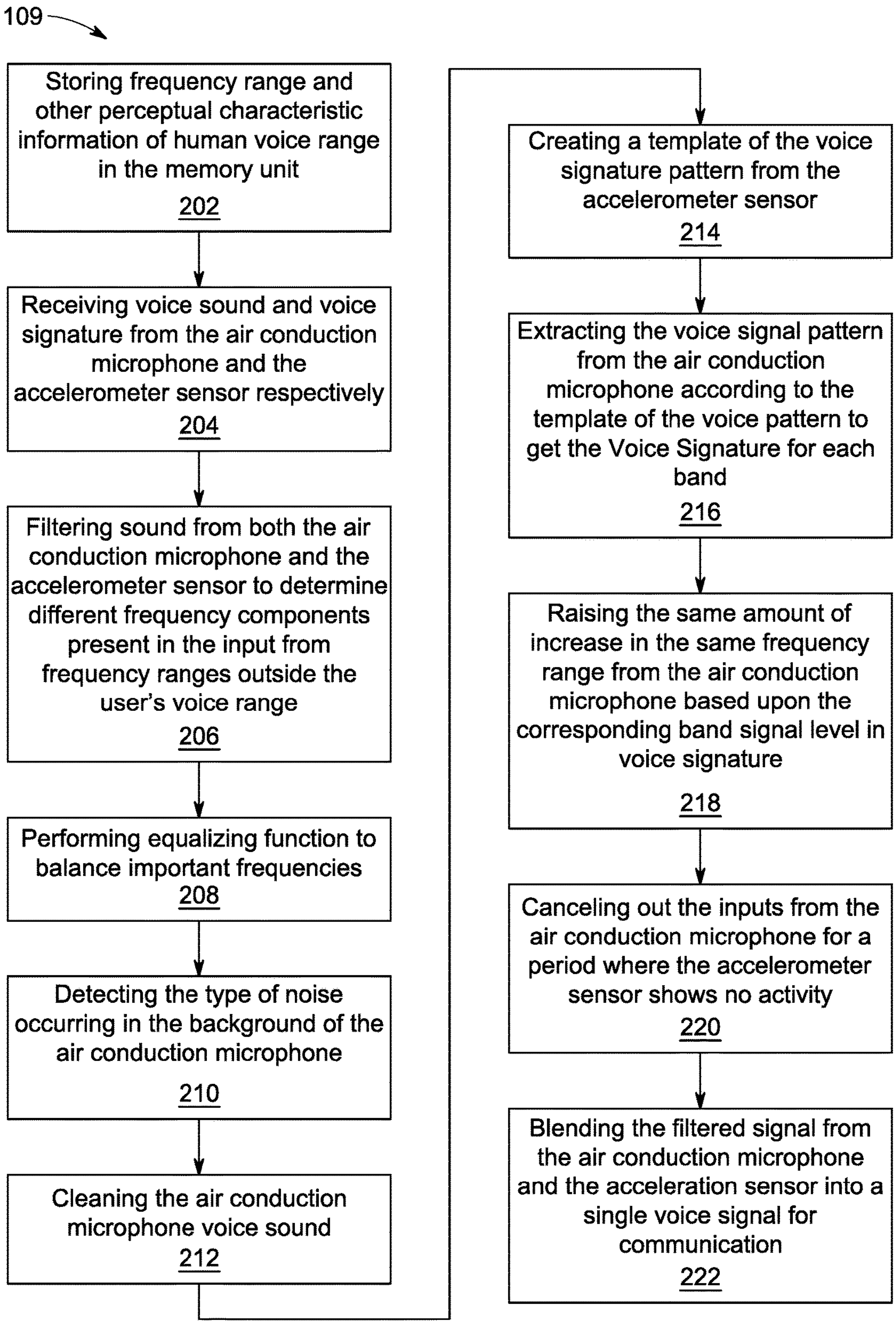
FIG. 2 illustrates a flowchart of instructions processed by the digital signal processor in accordance with a preferred embodiment of the present invention.

The instructions 109 are explained in detail in conjunction with FIG. 2 of the present invention. Examples of the memory unit 112 include but not limited to flash memory, cache memory, random access memory and read only memory etc.

Examples of the digital signal processor 114 includes but not limited to those made by Analog Devices, Texas Instruments, CSR etc. The printed circuitry board 110 is able to transfer the electric current from the battery 108 to the memory unit 112 and the digital signal processor 114.

FIG. 2 illustrates a flowchart of the instructions 109 processed by the digital signal processor in accordance with a preferred embodiment of the present invention. The instructions 109 initiates with a step 202 of storing frequency range of human voice range in the memory unit.

The fundamental frequency of human voice ranges from 85 Hz to 255 Hz. The human speech consists of tonal components and the noise components. The following frequencies are formulated based on human perceptual theory and required empirical tuning. The frequencies are: 200 Hz, 263.6 Hz, 294.7048 Hz, 457.8732 Hz, 603.5122 Hz, 795.413 Hz, 1054.4 Hz, 1389.172 Hz, 1820.158 Hz, 2400.078 Hz.

The step 202 is followed by a step 204 of receiving voice sound and voice signature from the air conduction microphone and the accelerometer sensor respectively. In another preferred embodiment of the present invention, the digital samples from voice sounds sources are passed through sub-band filters. The air conduction microphone uses two filter banks and the accelerometer sensor uses one filter bank.

The voice signature is converted to an array of numbers representing the audio signal power in each band represented in dB. The audio signal power for each band is computed according to the following expression:

$$P[sb]=20*\log(\Sigma^{i=n}{}_{i=0}X[i]^2)-\mathrm{REF}$$

P for each band is computed using the time-domain samples from the respective sub-band band index sb.

The voice signature is converted into Sub-band Gain by non-linear mapping. The mapping curve is decided based on the nature of the speech and adapted and switched based on the context. The accelerometer sensor signal envelops and voice activity pattern is detected according to the following expression:

$$E(i)=[\mathrm{HOLD}\ (\mathrm{THR}(\mathrm{LOG}(\mathrm{LPF}(x[i]]\hat{}2))))$$

Where LPF performs the low pass filtering and THR perform thresholding according to the profile. The HOLD will keep the signal high enough according to the sustain attack pattern.

The step 204 is then followed by a step 206 of filtering sound from both the air conduction microphone and the accelerometer sensor to determine different frequency components present in the input from frequency ranges outside the user's voice range. This scaling operation blocks the signal from air conduction microphone input when the signal strength of the accelerometer sensor is low.

The step 206 is then followed by a step 208 of performing equalizing function to balance important frequencies. The balancing is performed by using a software function to equalize the gain of specific frequency groups as described in paragraph [0035] of the description. The step 208 is then followed by a step 210 of detecting the type of noise occurring in the background of the air conduction microphone.

The detection is performed by comparing the noise signatures of that collected with a library noise signature to determine the most appropriate filtering. The step 210 is then followed by a step 212 of cleaning the air conduction microphone voice sound. The cleaning is performed by comparing the sound signature from the accelerometer sensor to that of the air conduction microphone and blocking sound outside of that range.

The step 212 is then followed by a step 214 of creating a template of the voice signature pattern from the accelerometer sensor. The template indicates the best sound signature to extract from the air conduction microphone input. The step 214 is then followed by a step 216 of extracting of the voice signature pattern from the air conduction microphone as per the template to get the voice signature pattern for a pre-determined duration.

The band power for each band is extracted by employing band-pass filters followed by digital signal processors. The computed power is mapped to a scale to get the voice signature for each band for the current frame. The step 216 is then followed by a step 218 of raising the equivalent amount of increase in the same frequency range from the air conduction microphone based upon the increase shown by the accelerometer sensor.

The raising is achieved with help of two sets of tunable filter arrays. The center frequencies of the Low Frequency (LF) filter is decided in accordance with paragraph [0035] of the description. The gain of the filter for a band is decided based on the voice signature (VS) gain of that band.

The center frequencies of the High Frequency (HF) Filter are set as the double of the LF for respective bands. A gain value is derived based on the VS gains are used to scale each band. The above composite step will ensure that the signal for respective bands is raised according to the signal level of bone conduction signal.

The step 218 is then followed by a step 220 of cancelling out the inputs from the air conduction microphone for a period where the accelerometer sensor shows no activity. The cancellation is performed by scaling every sample by the scale in time-domain. The step 220 is then followed by a step 222 of blending the filtered input from the air conduction microphone and the accelerometer sensor into a single voice file for communication. The blending results in producing a noise-free sound.

Figure 3:
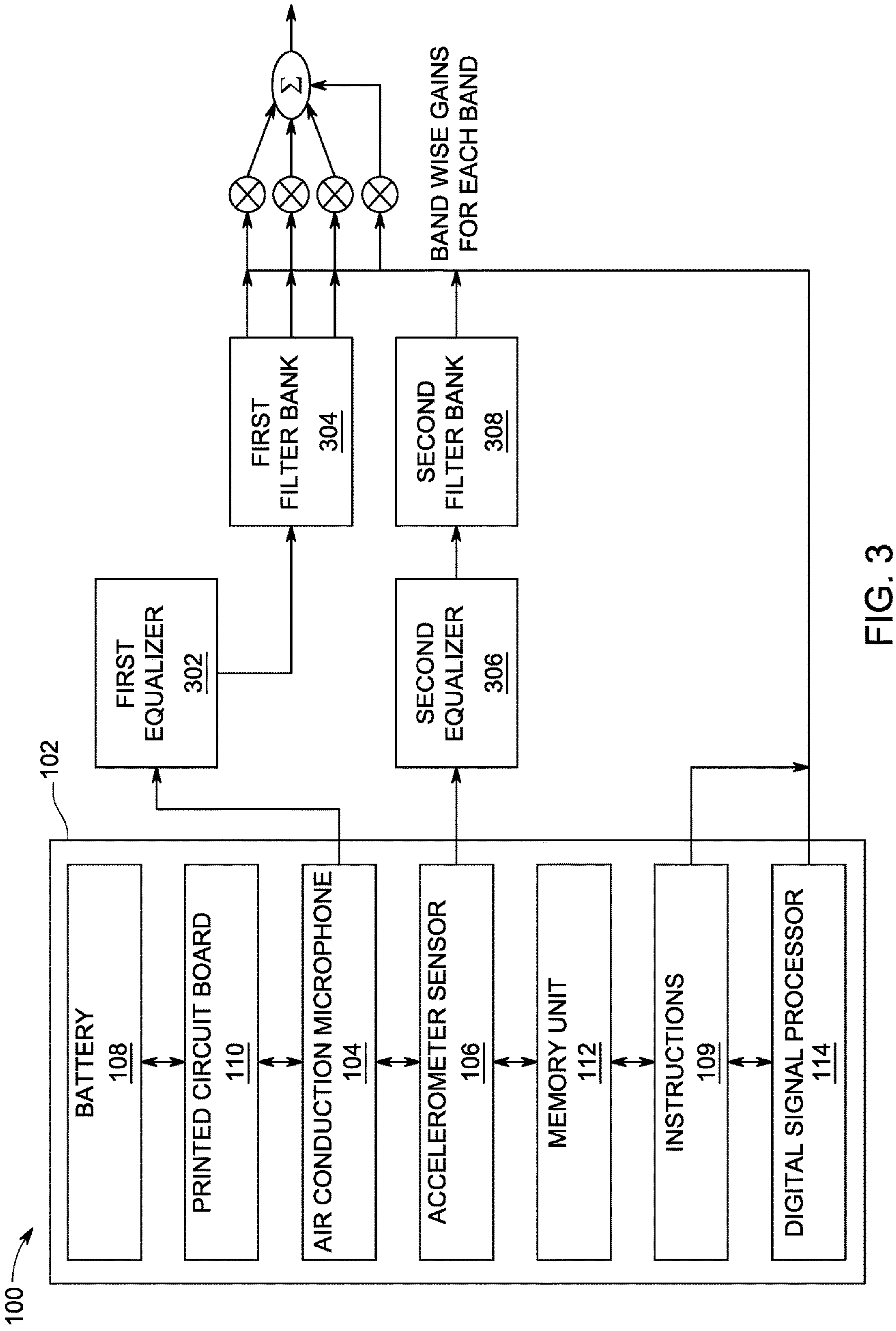
FIG. 3 illustrates a block diagram indicating the wearable device in accordance with another preferred embodiment of the present invention.

FIG. 3 illustrates a block diagram indicating the wearable device 100 in accordance with another preferred embodiment of the present invention. The wearable device 100 further includes a first equalizer 302, a first filter bank 304, a second equalizer 308 and a second filter bank 310.

The first equalizer 302 attenuates sound from the air conduction microphone 104 that are not associated with the frequencies of human voice. The first filter bank 304 splits the sound received from the first equalizer 302 into various frequencies bands. The first filter bank 304 applies gains reported based on corresponding bands of the voice signature signal.

The second equalizer 306 blocks sound from the accelerometer microphone 106 that are not associated with the frequencies of human voice. The second filter bank 308 splits the sound received from the second equalizer 306 into various frequencies group. The second filter bank 308 applies gains used for scaling the respective bands of the first equalizer.

The splitting of the sound is based on human auditory bands and compute the power levels for each band with a specified level of attack, sustain and decay parameters. The computed power levels are used to compute the voice signature (VS) band gains for each band.

The human voice frequency ranges is explained in para [0035] of the description. Further in a preferred embodiment of the present invention, the first filter bank 304 and the second filter bank 308 splits the sound received from the first equalizer 302 and the second equalizer 306 respectively, into 20 frequency groups.

The instructions 109 further includes the steps of dynamically adjusting the gain of frequency groups received from the first filter bank 304 based on the gain levels measured of the voice signature from the second filter bank 308. Further, the voice signals are processed and reassembled in the various frequencies into a single output sound.

The voice signature is computed based on samples from accelerometer sensor 106. The output samples from the first filter bank 304 and second filter bank 308 in the digital microphone path is scaled using the gain derived based on the voice signature.

Example of first equalizer 302 and the second equalizer 306 are but not limited to IIR based tone controls, peaking, shelving or band-pass filters, FIR based band-pass filters, short-time FFT or multi-rate filter banks. In another preferred embodiment of the present invention, the output from the first equalizer 302 and the second equalizer 306 is then passed through the digital signal processor 114 with tunable attack, sustain and hold parameters.

The equalizer pattern and the dynamic processor parameters are selected and adapted for a given context to match the speech behavior of the user. The output of the digital signal processor 114 is scaled further to get a scaling value for each time domain sample.

In another preferred embodiment of the present invention, the set of instructions 109 further include a step of performing sub-band domain gating of the signal from air conduction microphone 104 based on sub-band domain voice activity in the accelerometer sensor 106.

In another preferred embodiment of the present invention, the set of instructions 109 further include a step of performing Mel-Frequency cepstral coefficients (MFCC) domain gating of the signal from air conduction microphone 104 based on Mel-Frequency cepstral coefficients (MFCC) domain voice activity in accelerometer sensor 106.

Further in another preferred embodiment of the present invention, the instructions 109 further include the step of blending the low frequency signal from the accelerometer sensor 106 with the air conduction microphone 104 according to Spectral Band Replication (SBR) algorithm or any other bandwidth enhancement algorithms.

The equalizer pattern and the digital signal processor parameters are selected and adapted for a given context to match the speech behavior of the user. The output of the digital signal processor is scaled further to get a scaling value for each time domain sample.

The accelerometer sensor (e.g. bone conduction microphone) releases audio on a narrow band. The adjustment is delayed resulted in generating of time-domain signal. The time-domain signal is passed through an equalizer to the nominal bone conduction signal. The output from the equalizer is then passed through the digital signal processor with tunable attack, sustain and hold parameters to create a noise free wide band audio out.

In another preferred embodiment of the present invention, the instructions 109 further includes a step to keep the band signal and voice signature reference levels adaptive so that the variations in the accelerometer sensor is minimized due to changes in contact.

In another preferred embodiment of the present invention, the set of instructions 109 further include a step of applying adaptation of voice signature (VS) band scale factors so the output speech characteristic is closer to that of accelerometer sensor for the applicable frequency range.

In another preferred embodiment of the present invention, the set of instructions 109 further include a step of processing voice signal and voice signature from array of air conduction microphone and accelerometer sensor to achieve noise free sound.

The present invention offer various advantages such as significant noise reduction for speech transmission by body worn microphones, used for wireless communications. Further, the system allows voice conversations in noisy environments that would be too severe with traditional noise cancellation technologies.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The invention claimed is:

1. A wearable device for producing noise free communication, the wearable device comprising:

a housing configured to wear by a user;

an air conduction microphone configured in the housing to receive voice sound of the user;

an accelerometer sensor configured in the housing to receive voice signature;

a battery configured in the housing to power the air conduction microphone and the accelerometer sensor;

a printed circuitry board configured in the housing to receive power from the battery;

a memory unit connected to the printed circuitry board to store plurality of instructions;

a digital signal processor connected to the printed circuitry board to process the stored plurality of instructions, wherein the instructions comprising the steps of:

storing frequency range and other perceptual characteristic information of human voice range in the memory unit;

receiving voice sound and voice signature from the air conduction microphone and the accelerometer sensor respectively;

filtering sound from both the air conduction microphone and the accelerometer sensor to determine different frequency components present in the input from frequency ranges outside the user's voice range;

performing equalizing function to balance important frequencies;

detecting the type of noise occurring in the background of the air conduction microphone;

cleaning the air conduction microphone voice sound;

creating a template of the voice signature pattern from the accelerometer sensor;

extracting of the voice signature pattern from the air conduction microphone as per the template to get the voice signature pattern for a pre-determined duration;

raising the same amount of increase in the same frequency range from the air conduction microphone based upon the corresponding band signal level in voice signature from the accelerometer sensor;

cancelling out the inputs from the air conduction microphone for a period where the accelerometer sensor shows no activity; and blending the filtered signal from the air conduction microphone and the accelerometer sensor into a single voice signal for communication.

2. The wearable device according to claim 1 further comprising a first equalizer to attenuate sound from the air conduction microphone that are not associated with the frequencies of human voice.

3. The wearable device according to claim 2 further comprising a first filter bank to split the sound received from the first equalizer into various frequencies bands, and apply gains reported based on corresponding bands of the voice signature signal.

4. The wearable device according to claim 3 further comprising a second equalizer to block sound from the accelerometer sensor that are not associated with the frequencies of human voice.

5. The wearable device according to claim 4 further comprising a second filter bank to split the sound received from the second equalizer into various frequencies bands, further the second filter bank apply gains used for scaling the respective bands of the first equalizer.

6. The wearable device according to claim 5 wherein the instructions further comprising the step of:

dynamically adjusting the gain of the frequency groups received from the first filter bank based on the gain levels measured of the voice signature gains from the second filter bank; and processing the voice signals and reassembling the various frequencies into a single output sound.

7. The wearable device according to claim 1 wherein instructions further comprising the step of adjusting and adapting the voice signature parameters, such as bands, sustain, tunable attack and hold patterns to match the user's speech characteristics.

8. The wearable device according to claim 1 wherein instructions further comprising the step of discriminating the gain factors between low frequency filter and high frequency filter banks according to SBR property of the speech.

* * * * *